United States Patent [19]

Morikawa et al.

[11] Patent Number: 5,058,548
[45] Date of Patent: Oct. 22, 1991

[54] COMBUSTION CHAMBER OF AN INTERNAL COMBUSTION ENGINE

[75] Inventors: Koji Morikawa, Musashino; Akira Furuya, Fuchu, both of Japan

[73] Assignee: Fuji Jukogyo Kabushiki Kaisha, Tokyo, Japan

[21] Appl. No.: 531,133

[22] Filed: May 31, 1990

[30] Foreign Application Priority Data

Jun. 26, 1989 [JP] Japan ................... 1-168936
Jun. 29, 1989 [JP] Japan ................... 1-168935

[51] Int. Cl.⁵ ............................................. F02B 3/00
[52] U.S. Cl. ................................... 123/298; 123/276; 123/145 A
[58] Field of Search ............ 123/298, 145 A, 305, 123/263, 276, 275, 146.5 R, 143 R, 434, 445

[56] References Cited

U.S. PATENT DOCUMENTS

| | | | |
|---|---|---|---|
| 4,203,393 | 5/1980 | Giardini | 123/263 |
| 4,389,986 | 6/1983 | Tanasawa | 123/298 |
| 4,577,601 | 3/1986 | Klak | 123/298 |
| 4,712,525 | 12/1987 | Ishida | 123/145 A |
| 4,920,937 | 5/1990 | Sasaki et al. | 123/276 |

FOREIGN PATENT DOCUMENTS

| | | | |
|---|---|---|---|
| 60-1322 | 1/1985 | Japan | 123/298 |
| 60-1323 | 1/1985 | Japan | 123/298 |
| 61-234222 | 10/1986 | Japan | 123/298 |
| 62-32214 | 2/1987 | Japan | 123/298 |
| 62-147012 | 7/1987 | Japan | 123/298 |

Primary Examiner—Raymond A. Nelli
Attorney, Agent, or Firm—Martin A. Farber

[57] ABSTRACT

A combustion chamber of an engine has a fuel injector provided for injecting fuel directly in the combustion chamber. An arc-shaped offset cavity is formed in a roof of the combustion chamber, and a fuel injector is located at a top of the cavity on the axis of the cylinder of the engine. A spark plug is located on the axis so as to ignite the fuel injected from the injector and passing the gap of the spark plug.

2 Claims, 11 Drawing Sheets

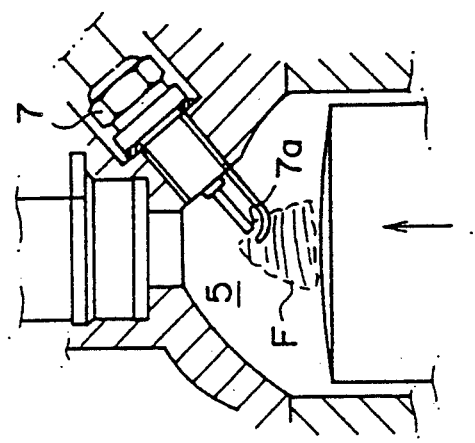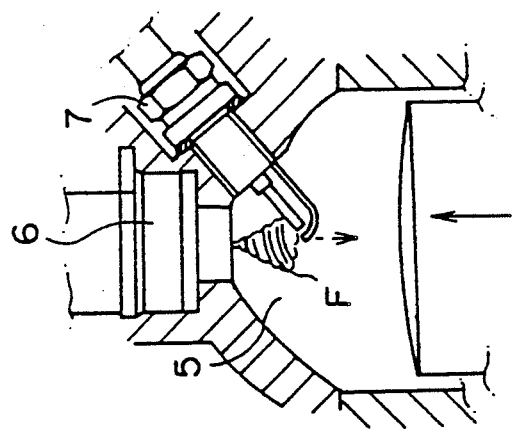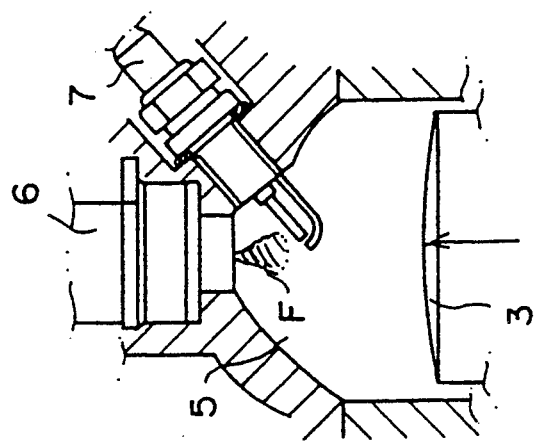

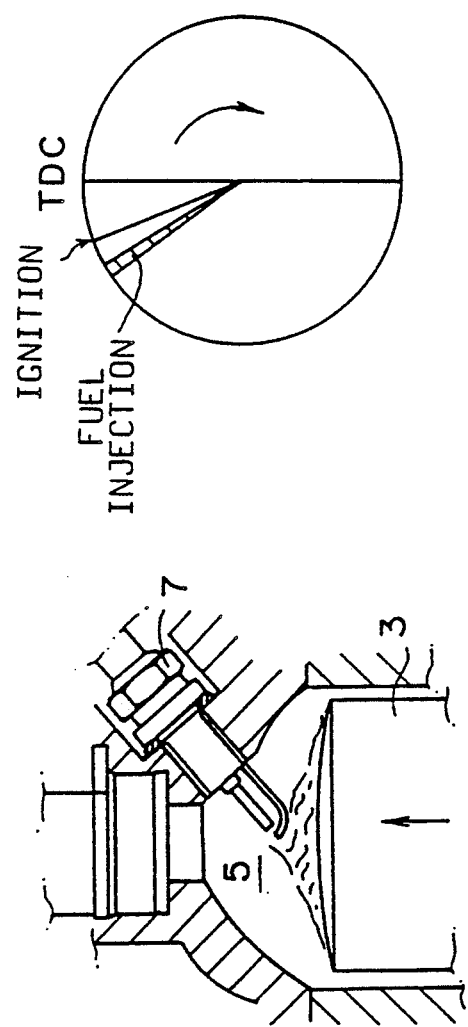

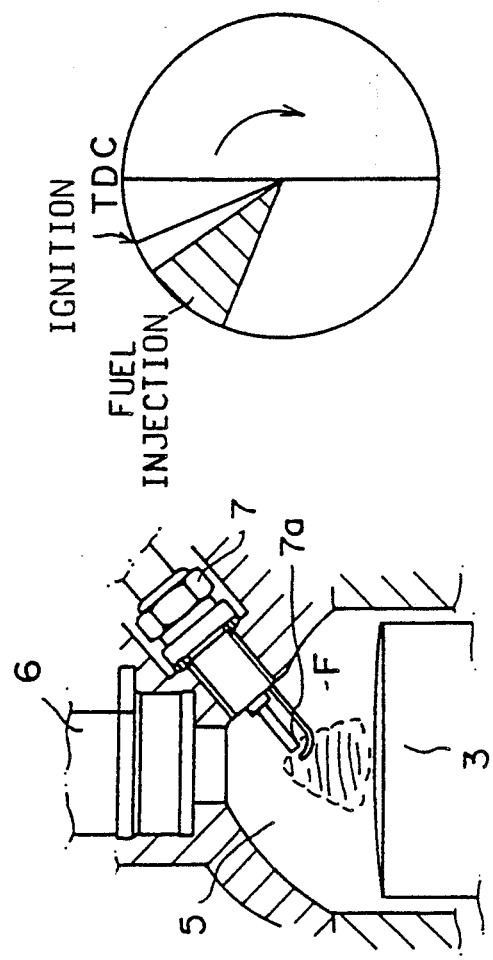

COMBUSTION CHAMBER OF AN INTERNAL COMBUSTION ENGINE

BACKGROUND OF THE INVENTION

The present invention relates to a combustion chamber of an engine with a direct fuel injection system, and more particularly to a combustion chamber configuration of the engine for promoting stratified combustion.

In a direct fuel injection system, a rich air-fuel mixture is injected from an injector near a spark plug while dispersion of the fuel is suppressed. The mixture is ignited with the spark plug and continuously burned with flame propagation to achieve the stratified combustion.

In order to improve scavenging efficiency in a light engine load range of a two-cycle engine and to prevent the fuel from escaping through an exhaust port, the direct fuel injection system has been proposed. In the system, air is only induced into the cylinder by a scavenge pump through a scavenge port, and the fuel is directly injected into the cylinder by a fuel injector after closing the scavenge port. In such a system, the fuel injector and the spark plug are disposed in the combustion chamber of the cylinder.

In a four-cycle engine, engine load is controlled by controlling the fuel quantity from the injector, thereby reducing the throttle loss of intake-air. Thus, the air-fuel ratio becomes lean to improve thermal efficiency and fuel consumption. Therefore, it is desirable to achieve the strafified combustion in a wide operational range of the engine. However, if the mixture is burned in a stratified mode in a heavy engine load range, the air can not be sufficiently used and hence large engine power does not occur. Therefore, it is necessary to change the combustion mode to a homogeneous mixture combustion.

In order to ensure a smooth transfer of the combustion mode from the stratified charge to a homogeneous mixture, it is necessary to properly determine a position and direction of the injector, the spark plug and a gap of the plug, the flow of injected fuel, a fuel injection rate, and a fuel injection timing corresponding to the ignition timing.

Conventional engines having the direct fuel injection systems have been proposed as follows.

First, "Internal Combustion Engine" (Nainen Kikan), Vol. 25, Oct., 1986, (Pages 26, 27, 29 and 31) discloses combustion methods of FORD PROCO, TEXACO TCCS, MAN-FM and VW in which a rich air-fuel mixture is directed toward the gap of the spark plug by swirling the mixture.

Second, Japanese Patent Application Laid-Open 60-1322, 60-1323 and 61-234222 disclose system, each of which has a sub-combustion chamber provided beside a main combustion chamber. The injector and the spark plug are provided in the sub-chamber so that the fuel injection, ignition and stratified charging are performed in the sub-chamber.

Third, Japanese Patent Application Laid-Open 62-147012 discloses a system in which a cavity is formed in a piston crown and the fuel is injected and ignited at a top dead center.

In the first conventional system, the cycle of the swirl largely fluctuates in accordance with the engine operating conditions by measuring with a laser flow meter. It is difficult to ignite the fuel in any engine operating condition. In a heavy engine load range, the fuel is not equally dispersed due to the swirl so that the homogeneous mixture combustion is not obtained. Consequently, large engine power in the heavy load range can not be expected.

In the second system, the charge stratification is promoted at light engine load. However, fuel consumption is increased because of the throttle loss in the passage between the sub-chamber and the main chamber. Further, at heavy engine load, air is not sufficiently used so that the engine does not produce a large engine power, but it has disadvantages such as a generation of smoke. If such a system is used for the two-cycle engine, scavenging cf the sub-chamber becomes insufficient. Accordingly, the burned gas remains in the sub-chamber, which means incomplete combustion.

In the third system, the ignition timing must be determined before the top dead center due to ignition delay. However, since the chamber is formed on the piston crown, the ignition timing and the fuel injection timing can not be properly controlled. In addition, such a system can not be used for the two-cycle engine because of insufficient scavenging.

Japanese Patent Application Laid-Open 62-32214 discloses such a two-cycle engine. The two-cycle engine has a spherical cavity formed in a roof of the combustion chamber, positioned eccentrically with the respect to the axis of the cylinder. The cavity promotes turbulence of the fresh air in the vertical direction to form a vertical swirl. The injected fuel is mixed with the turbulent air, which is carried toward the spark plug. A fuel injector and a spark plug are provided at a cavity top.

Since depth of the cavity is considerably large (0.55–0.77 times the diameter of the cylinder), a small amount of fresh air flows into the cavity. Thus, the burned gas can not be sufficiently discharged so that incomplete combustion may occur because of the insufficient scavenging. Furthermore, the spark plug is provided in the cavity, and the flame propagation is delayed at heavy engine load, causing knocking of the engine. In addition, since an axis of the cavity is located off the axis of the cylinder, the radius of the vertical swirl becomes small. As a result, while the exhaust and scavenge ports are opening, the scavenging flow is insufficient to reach the end gas. Thus, the burned gas remains in the cylinder, causing the incomplete combustion and knocking.

Since the injector provided in the cavity is also located off the axis of the cylinder, the fuel injected from the injector adheres to the inside wall of the cylinder at heavy engine load, which may cause insufficient dispersion of the fuel. Thus, combustion efficiency is reduced.

SUMMARY OF THE INVENTION

The object of the present invention is to provide a direct fuel injection control system for an engine in which timing and duration of fuel injection are controlled in accordance with engine operating conditions so as to improve combustion stability, fuel consumption, and thermal efficiency of the engine.

According to the present invention, there is provided a combustion chamber of the engine having at least one cylinder, which has a piston, a combustion chamber defined in the cylinder by the piston, a fuel injector provided for injecting fuel directly in the combustion chamber, and a spark plug.

The fuel injector is located at a position close to an axis of the cylinder, and the spark plug is located at a position such that a gap of the spark plug is positioned around the axis, and disposed apart from the injector by a predetermined distance for igniting the fuel injected from the injector and passing the gap.

In an aspect of the invention, the injector is a type for injecting fuel in the form of a cone, and the distance from the injector to the spark plug is between a first position where speed of fuel spray at middle and low loads on the engine becomes low and a second position where dispersion of the fuel spray becomes a predetermined spread.

A roof of the combustion chamber has an offset cavity having an arc-shaped cavity and a plug mounting portion having a flat surface in parallel with a slope of the cone, and the fuel injector is located at a top of the cavity.

The other objects and features of this invention will become understood from the following description with reference to the accompanying drawings.

BRIEF DESCRIPTION OF THE DRAWINGS

FIGS. 3a to 3d are schematic diagrams explaining formation of combustible mixture in a light load range of the engine;

FIG. 3e is a diagram showing a fuel injection timing thereof;

FIG. 4a is a schematic diagram showing an ignition in a middle load range;

FIG. 4b is a diagram showing a fuel injection timing of FIG. 4a;

DETAILED DESCRIPTION OF THE PREFERRED EMBODIMENTS

Figure 1:
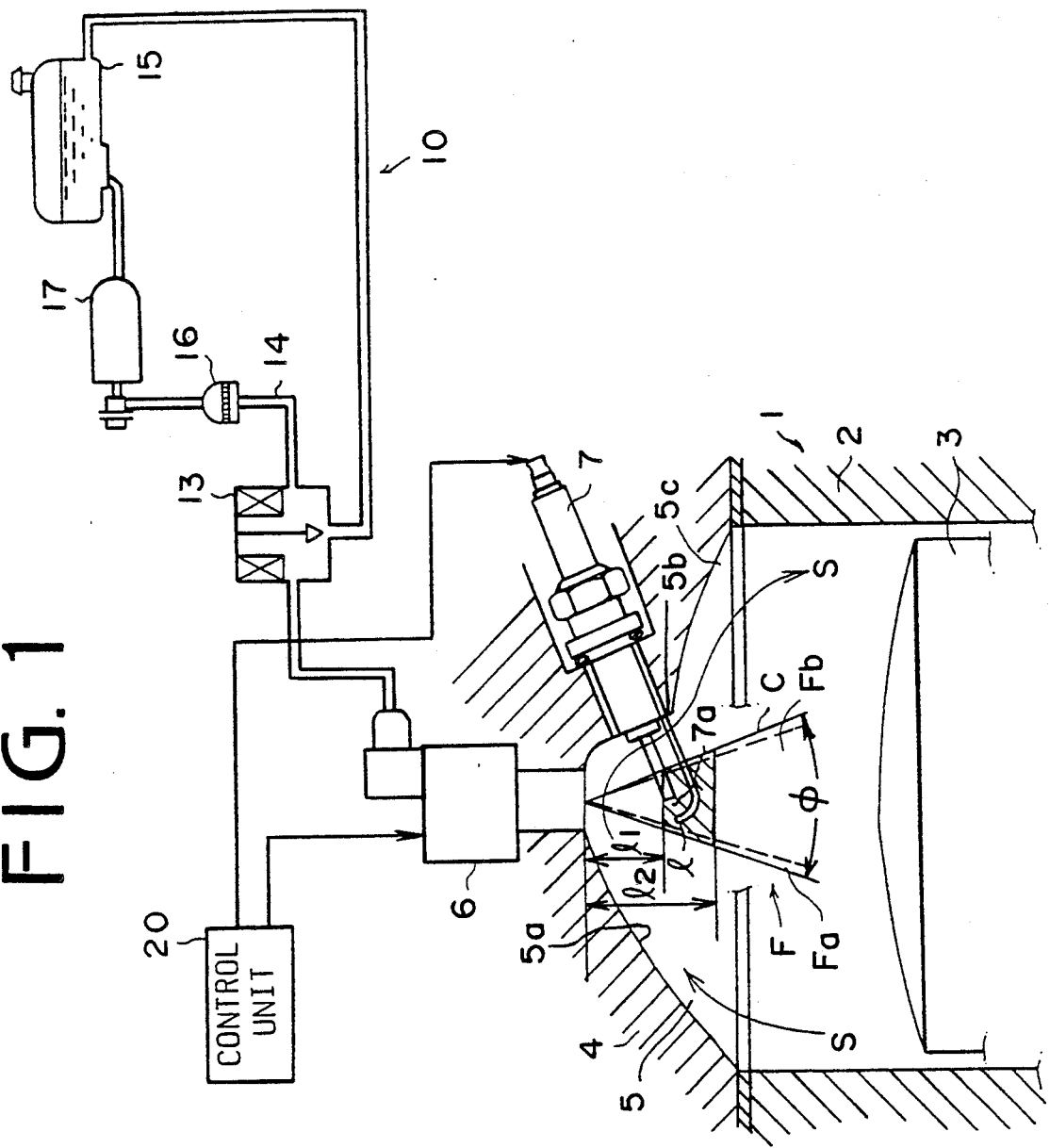
FIG. 1 is a schematic diagram of a two-cycle engine according to the present invention.

Referring to FIG. 1, a two-cycle engine 1 comprises a cylinder 2, a piston 3 provided in the cylinder 2, and a combustion chamber 5 formed in a cylinder head 4 and an upper portion of the cylinder 2.

The combustion chamber 5 has an arc-shaped cavity 5a on the roof thereof located offset from the axis of the cylinder 2 and a plug mounting portion 5b vertically formed on the roof of the chamber 5. The arc-shaped cavity 5a is connected to a squish zone 5c through the plug mounting portion 5b.

Fuel in a fuel tank 15 of a fuel supply system 10 is supplied to a injector 6 through a fuel passage 14 having a pump 17, a filter 16 and a pressure regulator 13 for maintaining the fuel at a predetermined pressure. A control unit 20 feeds a fuel injection quantity signal and an injection timing signal to the injector 6 for injecting the fuel and an ignition timing signal to a spark plug 7 for igniting the spark plug.

The injector 6 is a type of an electromagnetic single-hole nozzle and an injection angle $\phi$ of a fuel spray is preferable between 40 and 80 degrees.

Figure 2A:
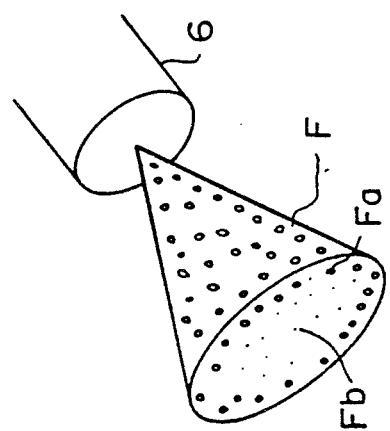
FIG. 2a is a graph showing characteristics of a fuel injector.

Referring to FIG. 2a showing characteristics of a diameter of a particle and penetration force of the injected fuel corresponding to injection pressure of the engine 1. If the injection pressure is between 30 and 100 kg/cm$^2$ within an optimum using range a, the penetration force becomes constant and the power of injection is used for pulverization of the fuel, so that the diameter of the particle becomes small such as an average diameter of 10 $\mu$m.

Figure 2B:
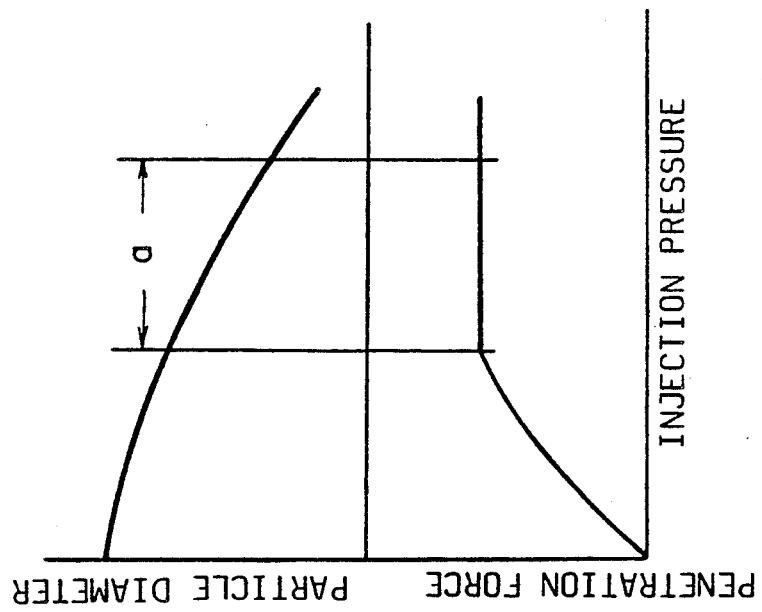
FIG. 2b is a schematic perspective view of a fuel spray.

Referring to FIG. 2b, a fuel spray F has a conical shape. The diameter of the particle in an outer peripheral portion Fa of the spray F is a large diameter and the fuel density of the portion is high. However, the large particle is sheared by the air, thereby becoming fine particles. Thus, the fuel in the portion is in an easily ignitable condition. An inside portion Fb of the spray F has a low density and includes the particles of a small diameter, so that the fuel in the portion is also in an ignitable state. In this case, the rate of fuel injection (quantity of fuel injected per hour) is determined to a predetermined constant value.

A swirl S is generated in the combustion chamber 5 by the scavenging air and flows from the wall of the cylinder 2 through the cavity 5a and the portion 5b to the squish zone 5c. The fuel is injected at a predetermined pressure, penetrating the swirl.

The distance between the injector 6 and the gap 7a should be determined to be a proper value. If the distance is short, the velocity of the fuel spray F at the gap 7a is high. Consequently, the fuel is not yet sufficiently mixed with the air so that the fuel is hardly ignited by the spark plug 7. If the distance is long, the fuel spray is so largely diffused that the mixture becomes lean. This causes difficulty in ignition. In addition, the fuel mixture is disturbed by the swirl. Accordingly, the gap 7a is located at a position having a distance l from the injector 6 between a first distance l1 and a second distance l2. At the first distance l1 for example, 15 mm, the velocity of the spray becomes a predetermined speed lower than the initial speed. At the second distance l2 for example 30 mm, a predetermined diffusion of the spray F is obtained.

The control unit 20 determines the fuel injection timing before the ignition timing and increases the fuel injection pulse width in accordance with the engine load. The fuel injection timing is advanced with an increase of the quantity of the fuel in accordance with the engine load.

The plug mounting portion 5b is formed in parallel with a slope C of the cone of the spray F.

The operation of the two-cycle engine 1 is described hereinafter with reference to FIGS. 3 to 5.

When the piston 3 descends to open an exhaust port (not shown), a part of the burned gases is discharged from the exhaust port. When scavenge ports (not shown) open, pressurized scavenge air is delivered into the cylinder 2 through the scavenge ports in opposite directions of the exhaust port. The scavenge air is upwardly turned by the wall of the cylinder 2 and inverted by the wall of the cavity 5a to form the vertical swirl S. Consequently, burned gases in the cylinder 2 are scavenged so that fresh intake air is admitted therein with vertical swirling.

During the upward stroke, the piston 3 rises to close the scavenge and exhaust ports. A small amount of the fuel is injected from the injector 6 after the exhaust port closes.

During the operation of the engine, the fuel is supplied to the injector 6 at pressure regulated by the regulator 13 of the fuel supply system 10.

The control unit 20 transmits the fuel injection signal to the injector 6 which injects a quantity of the fuel in the cylinder 2 in accordance with the engine load at a predetermined injection timing. A coil of the spark plug 7 is energized in accordance with the ignition signal to ignite the fuel spray of the rich air-fuel mixture with a spark at the gap 7a.

In a light engine load range, a small quantity of fuel is injected immediately before the ignition as shown in FIG. 3e. As shown in FIG. 3a, a small quantity of conical-shaped fuel spray F is injected from the injector 6. As shown in FIG. 3b, the fuel is dispersed by mixing with the air for atomization, and the density of the fuel spray is reduced. At that time, the fuel spray F is slightly moved toward the spark plug 7 in accordance with the vertical swirl. However, since injection pressure and initial speed, of the fuel spray are high, the fuel spray is not greatly affected by the swirl. As shown in FIG. 3c, the fuel spray reaches the gap 7a of the spark plug 7. In this state, the velocity of the spray drops and the spray is properly dispersed. Thus, the fuel is reliably ignited by the spark plug 7. As shown in FIG. 3d the flame is expanded from a portion in front of the gap 7a in a stratified combustion mode.

As shown in FIG. 4b, in a middle engine load range, the fuel injection timing is advanced and the quantity of the fuel is increased. The duration of the fuel injection is elongated to increase the quantity of the fuel corresponding to a predetermined fuel injection rate. The fuel is dispersed in the same manner as the light engine load range so that the fuel is ignited as shown in FIG. 4a. Since the fuel injection starts during the early state of the compression stroke, diffusion of the spray F increases a combustion area in spite of the charge stratification.

Figure 5A:
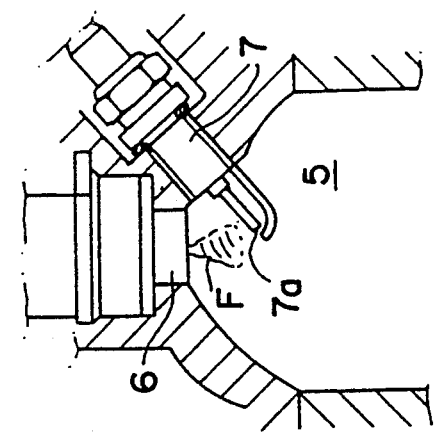
FIGS. 5a to 5e are schematic diagrams explaining the formation of the combustible mixture in a heavy load range.
Figure 5B:
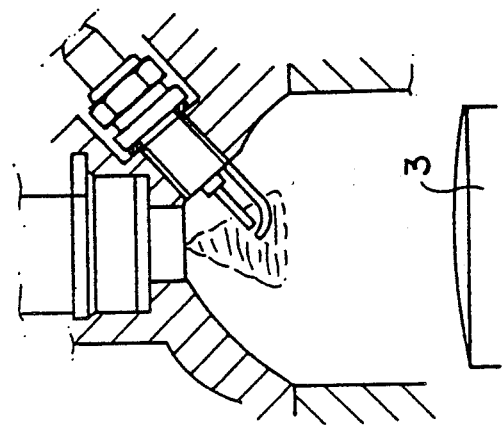
Figure 5C:
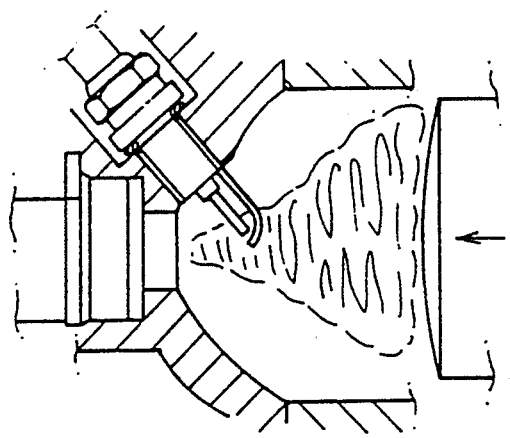
Figure 5D:
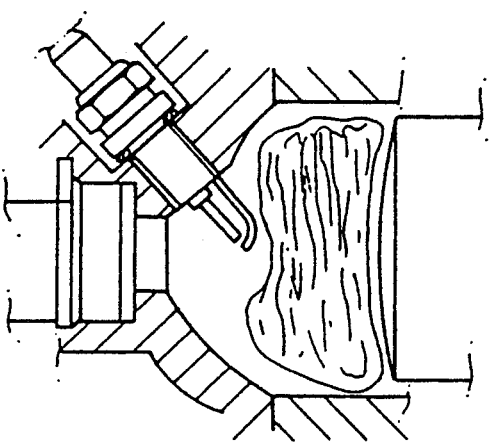
Figure 5E:
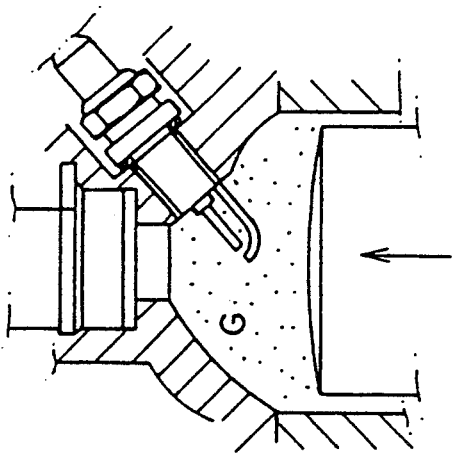
Figure 5F:
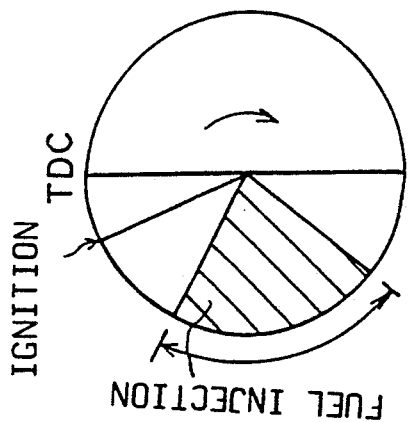
FIG. 5f is a diagram showing a fuel injection timing thereof.

In a heavy engine load range, the fuel injection starts immediately after closing the exhaust port as shown in FIG. 5f. As shown in FIGS. 5a to 5c, a large quantity of the fuel F is injected in accordance with the long injection duration. Since the fuel is provided in the center of the cylinder, the fuel is widely dispersed as a result of a sufficient penetration of the fuel spray. As shown in FIG. 5d, the fuel is further mixed with the air during the compression stroke to produce a homogeneous mixture G as shown in FIG. 5e. Consequently, the combustible mixture is properly ignited by the spark plug 7 and the flame expands in all directions.

The quantity of the injected fuel is increased with an increase of the engine load, and the fuel injection timing is advanced, so that the stratified combustion automatically transfers to the homogeneous mixture combustion.

Figure 6:
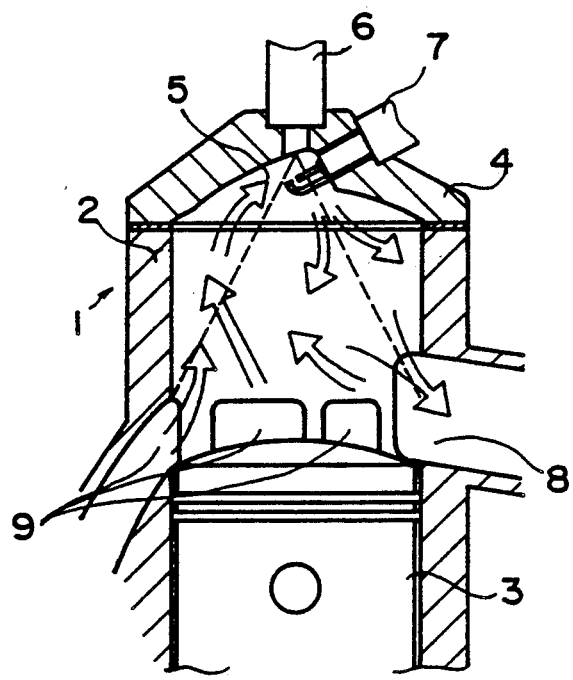
FIG. 6 is a schematic diagram of the two-cycle engine as a second embodiment of the present invention.
Figure 7:
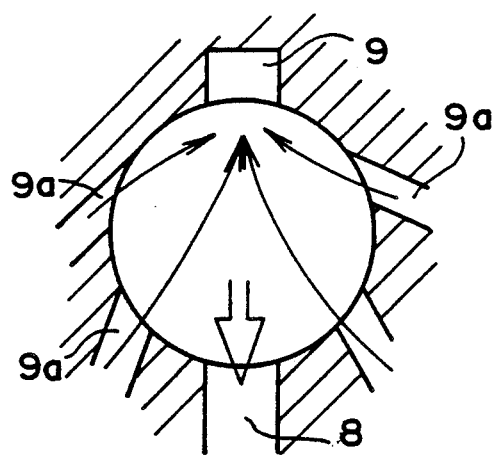
FIG. 7 is an illustration showing positions of scavenge ports.

Referring to FIG. 6 showing a second embodiment of the present invention, in the wall of the cylinder 2, an exhaust port 8 is formed and a plurality of scavenge ports 9, for example five ports are formed opposite to and at lower positions than those of the exhaust port 8. A passage of the central scavenge port 9 is upwardly directed, and other passages of the other scavenge ports 9a are directed to the central port 9 as shown in FIG. 7, so that a vertical swirl S is formed in the cylinder.

Figure 8:
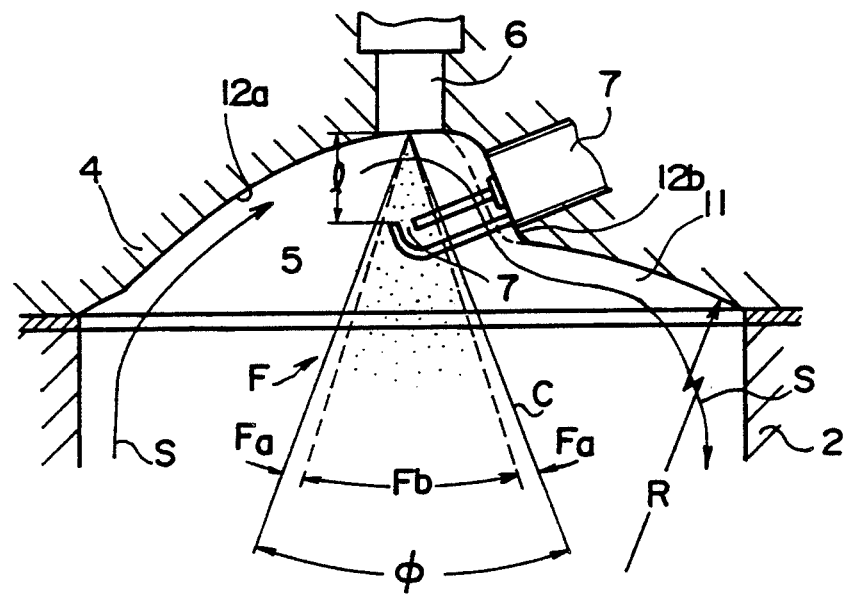
FIG. 8 is an enlarged sectional view showing a combustion chamber of the cylinder.
Figure 9:
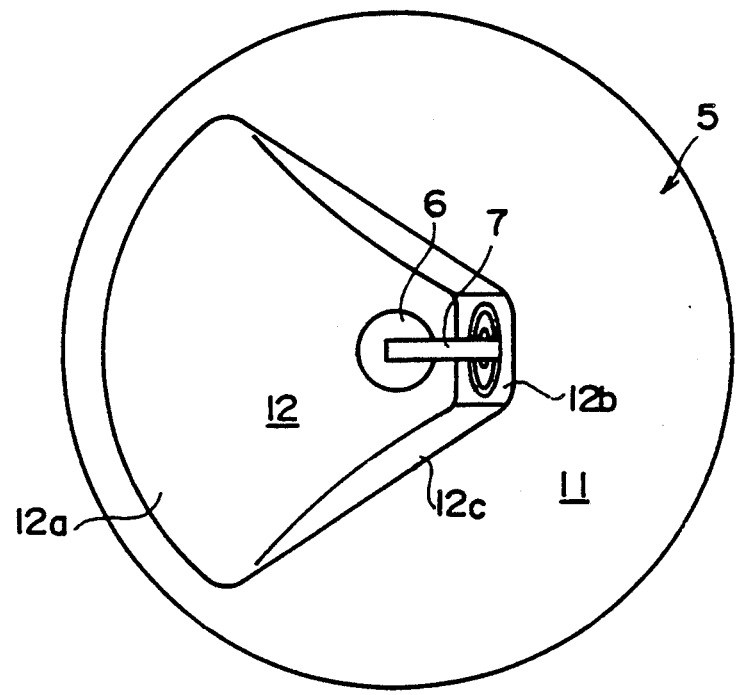
FIG. 9 is a plan view of a roof of the combustion chamber.

Referring to FIGS. 8 and 9, a roof of the combustion chamber 5 has a spherical offset cavity 12 which is located offset from the axis of the cylinder 2 in a direction opposite the exhaust port 8. The roof surrounding the cavity 21 is curved with a large radius of curvature R so as to form a squish zone 11 between the piston 3 and the roof. The spherical offset cavity 12 has a sector-shaped (in a plan view) portion 12a as a roof portion, a plug mounting portion 12b formed on the end of the sector-shaped portion 12a steeply inclined from the sector-shaped portion and taper portions 12c surrounding the sector-shaped portion 12a and the plug mounting portion 12b. In a vertical section, the sector-portion 12a is curved from the outer periphery of the cavity 12 to the center of the combustion chamber 5 to form a deepest portion on the top of the combustion chamber 5. Thus, the plug mounting portion 12b is located apart from the center of the combustion chamber 5. The inclination angle of the portion 12b to the axis of the cylinder is one-half of the vertical angle $\phi$ of the cone of the fuel spray F. Namely the surface of the portion 12b is parallel with the slope C of the cone. The sector-shaped portion 12a and the curved squish zone 11 are smoothly connected to each other.

The fresh air fed from the scavenge ports 9, 9a is concentrated to form a vertical swirl and flows to the center of the sector-shaped portion 12a and to the plug mounting portion 12b at high speed. Thus, the burned gas around the injector 6 and the gap 7a is discharged.

The remaining operation is the same as the first embodiment.

Figure 10:
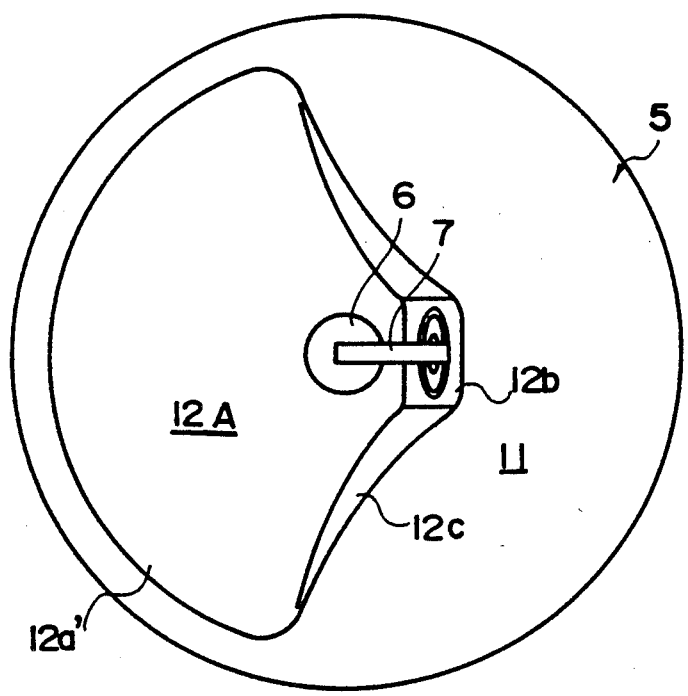
FIGS. 10 and 11 are plan views showing modifications of the second embodiment.
Figure 11:
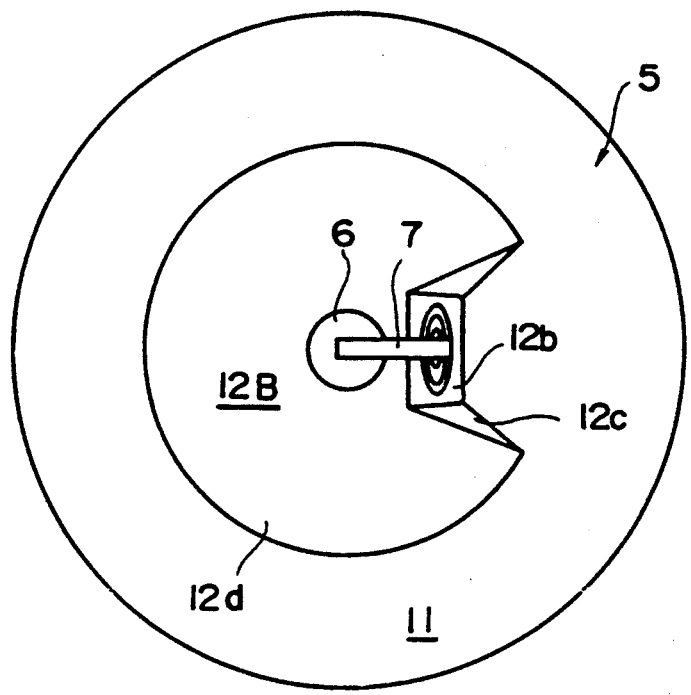

FIGS. 10 and 11 show modifications of the second embodiment.

Referring to FIG. 10, a cavity 12A has a sector-shaped portion 12a' having a larger area than that of the sector-shaped portion 12a. The opposite taper portions 12c are outwardly curved to increase the angle between the taper portions 12c so as to increase the circumferential length of the sector-shaped portion 12a'.

Referring to FIG. 11, a cavity 12B has a circular portion 12d concentrically formed with the combustion chamber 5 except for the plug mounting portion 12b. Consequently, the vertical swirl S is concentrated to improve the scavenging effect between the injector 6 and the gap 7a of the spark plug 7.

A squish zone is widely provided surrounding the cavity to produce a large squish effect, thereby preventing knocking.

Although the present invention describes embodiments applied to a two-stroke cycle engine, the present invention may be applied to a four-stroke cycle engine. Alcohol or a mixture of alcohol and gasoline may also be used.

In accordance with the present invention, the injector and the gap of the spark plug are disposed along the axis of the cylinder at a predetermined distance so as to provide a charge stratification. The fuel is effectively burned in the stratified combustion mode without using splashing at the piston crown and the wall of the cylinder. Further, the influence of cycle variation of the air flow is avoided so that stable combustion is obtained in a wide range of the engine operations. Since misfiring caused by the lean mixture and the remaining burned gas is prevented, combustion efficiency is improved at any engine operating condition so as to improve driveability, fuel consumption and emission control.

The system is available for various types of engines.

The stratified combustion automatically transfers to the homogeneous mixture combustion, thereby producing large engine power.

The charge stratification is properly controlled in accordance with spray characteristics, and timing and duration of injection. The fuel is preferably ignited at a low velocity and proper diffusion of the fuel spray.

Since the injector and the gap of the spark plug are disposed on the top of the combustion chamber, the combustion efficiency is improved.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A combustion chamber of an engine having at least one cylinder, which has a piston, a combustion chamber defined in the cylinder by the piston, a fuel injector provided for injecting fuel directly in the combustion chamber, and a spark plug, wherein:

said fuel injector is a type for injecting fuel in a form of a cone and is located at a position close to an axis of said cylinder, said spark plug is located at a position such that a gap of the spark plug is positioned around said axis, and disposed apart from the injector by a predetermined distance for igniting the fuel injected from the injector and passing said gap, said distance is between a first position where a speed of fuel spray at middle and low loads on said engine becomes low and a second position where a dispersion of the fuel spray becomes a predetermined spread.

2. A combustion chamber of an engine having at least one cylinder, which has a piston, a combustion chamber defined in the cylinder by the piston, a fuel injector provided for injecting fuel directly in the combustion chamber, and a spark plug, wherein:

said fuel injector is located at a position close to an axis of said cylinder;

said spark plug is located at a position such that a gap of the spark plug is positioned around said axis, and disposed apart from the injector by a predetermined distance for igniting the fuel injected from the injector and passing said gap, a roof of the combustion chamber has an arc-shaped offset cavity and a plug mounting portion having a flat surface parallel with a slope of said cone; and the fuel injector is located at a top of said cavity.

* * * * *